Figure 1:
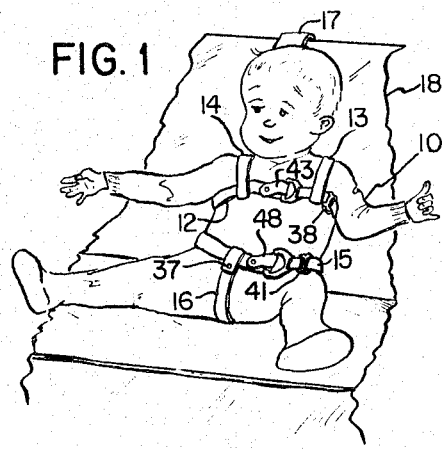

Jan. 31, 1967  M. S. PUKISH, JR  3,301,594

SAFETY HARNESS

Filed March 29, 1965

INVENTOR.
MICHAEL S. PUKISH, JR.
BY
*Cumpston & Shaw*
ATTORNEYS

United States Patent Office 3,301,594
Patented Jan. 31, 1967

3,301,594
SAFETY HARNESS
Michael S. Pukish, Jr., Penfield, N.Y., assignor to Vogt Manufacturing Corporation, Rochester, N.Y., a corporation of New York
Filed Mar. 29, 1965, Ser. No. 443,182
6 Claims. (Cl. 297—389)

The present invention relates to safety devices, and more particularly to an improved safety harness adapted to be worn by a passenger in a motor vehicle and especially suited to a child passenger.

The ability of seat belts and safety harnesses to protect passengers in an automobile from injury from sudden accelerations or decelerations such as caused by accidents, collisions, sudden turns or stops, roll-overs, etc. is well known. Especially for children, a harness rather than a single pelvic strap is preferred for restraining the torso to prevent injury. However, prior art safety harness devices have been cumbersome, difficult to get into, inconvenient to fit onto a child, and easily tangled when not in use. Also, such prior art devices have been difficult to untangle and have formed an unsightly confusion of straps and connectors when left in place in a vehicle.

It is an object of this invention to overcome the drawbacks of the prior art safety harnesses in providing a safety harness that gives optimum protection to the wearer, that allows a child wearing it to either sit or stand in an automobile, and that is relatively free from tangling and can be stored neatly in place in the vehicle when not in use.

Another object of the invention is to support both the chest and pelvic portions of the torso of a passenger's body within an automobile so as to mitigate the results of any accident in which the vehicle is involved.

Another object of the invention is to support a safety harness in a movably mounted position within a vehicle by means of a spacer plate so as to keep the harness straps from becoming tangled, unsightly, or difficult to fit onto a child. An additional object of the invention is to restrain such a harness in place even if the supporting spacer plate tears or breaks, so that the harness arrangement becomes fail-safe, and a related object of the invention is to allow the child maximum freedom of motion and yet offer the desired protective restraint in such a safety harness.

Another object of the invention is to make an improved safety harness especially adapted for restraining children within a vehicle and which is easy to fit onto the child and comfortable for the child to wear and which stays untangled not only while being worn by the child, but while stored in position in the vehicle in which it is ready for convenient use.

Other objects of the invention will be apparent hereinafter from the specification and from the recital of the appended claims. To these and other ends, the invention resides in certain improvements and combinations of parts, all as will be hereinafter more fully described, with the novel features being pointed out in the claims at the end of this specification.

Figure 2:
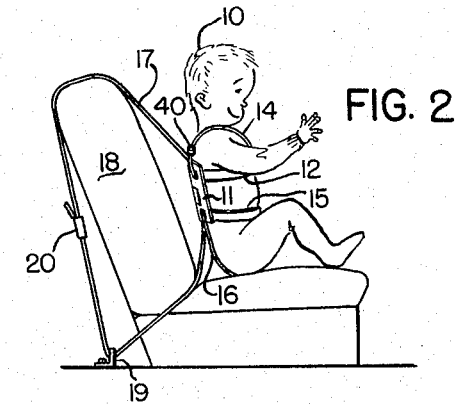
Figure 3:
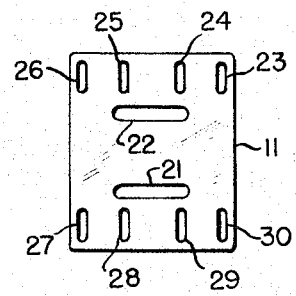
Figure 4:
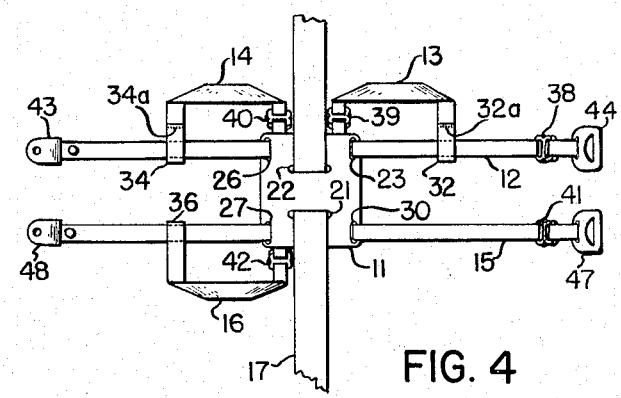
Figure 5:
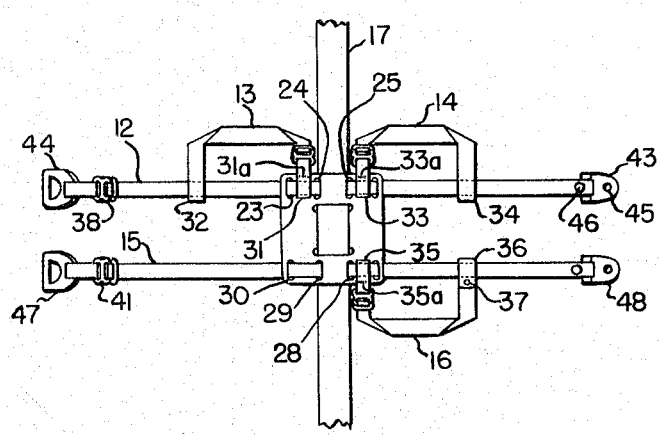

In the drawings:
FIG. 1 is a front view of a safety harness constructed in accordance with one embodiment of the present invention when being used;
FIG. 2 is a side view of the safety harness of FIG. 1 when being used;
FIG. 3 is a front view of the back spacer plate utilized as part of the improved safety harness of the present invention;
FIG. 4 is a front view of the improved safety harness when ready for attachment to a wearer; and
FIG. 5 is a rear view of the safety harness shown in FIG. 4.

Generally, the inventive harness provides bands or straps encircling the torso. Such straps can be formed of a variety of materials such as plastic strips, leather, or preferably woven fabric webbing material. Such straps preferably encircle both the chest and pelvic regions of a torso and preferably include shoulder straps and a crotch strap connected to these torso-encircling straps. These harness straps are threaded through a support or spacer plate for maintaining them in a desired orientation for untangled storage and for easy fitting onto a wearer. An anchoring strap is also threaded through the spacer plate and preferably passed inside the harness straps so as not only to anchor the spacer plate and harness strap assembly in place on the back of a seat, but to be fail-safe if the spacer plate tears or breaks. Preferably, the anchoring strap is firmly fixed in place in a vehicle, and the spacer plate is adapted to slide vertically on the anchoring strap to allow a child wearer to stand or sit within the vehicle. Although the spacer plate can be rigid, it is preferably flexible and formed of a material such as synthetic plastic to allow maximum freedom of motion for the wearer and to minimize wear or cutting of either the anchoring or harness straps.

The spacer plate 11 is important to the improved safety harness provided by this invention and is shown in more detail in FIG. 3. Spacer plate 11 is so designed that it can be fabricated simply from a variety of materials including woven fabric, sheet metal, pressed fiber board, or preferably a synthetic plastic. Preferably, spacer plate 11 is made flexible by selection of material and thickness so that it will bend or flex with the wearer, to facilitate arm and leg movement, as will be described hereinafter, and also to prevent it from wearing against or cutting the various straps 12–17 during use. Preferably, the spacer plate 11 is formed with a pair of horizontal slots 21 and 22 extending therethrough and being spaced one above the other adjacent the middle portion of the plate 11, when viewed as in FIG. 3, to permit attachment of the plate 11 slidably on the anchoring strap 17. The plate 11 is also preferably formed with vertical slots 23–30 which are disposed in the upper and lower portions of the plate 11, in pairs, to facilitate attachment of the supporting straps 12–16 to the spacer plate 11.

As viewed in FIG. 4, the spacer plate 11 is attached slidably on anchoring strap 17 by threading such strap 17 rearwardly through the lower slot and forwardly through the upper slot 22. Anchoring strap 17, which extends over the back rest portion 18 of the vehicle seat (see FIG. 2), is anchored to the vehicle by means of bracket 19 and is preferably adjustable for a tight fit by means of fastener 20. Anchoring strap 17 serves as the main restraining strap to support the harness (and the passenger, if the harness is being worn) against the seat back rest 18.

The various supporting straps 12–16 of the illustrated embodiment of the inventive safety harness are clearly illustrated in FIGS. 4 and 5 which show the harness when the chest strap 12 and pelvic strap 15 are in their respective detached or open positions and the harness is ready to be attached to a wearer. The respective ends 31–32 and 33–34 of the shoulder straps 13 and 14 respectively are preferably formed as loops, for example, by folding back and stitching at 31a, 32a, 33a, and 34a, to facilitate attachment of the shoulder strap ends to the chest strap 12; the respective ends 35 and 36 of the crotch strap 16 are also looped to facilitate attachment to the waist or pelvic strap 15. Preferably, the front loop end 36 of crotch strap 16 is provided with a snap connection indicated at 37, to permit easy detachment of this front end of strap 16 from pelvic strap 15, if desired; and the back loop end 35 can be formed by stitching at 35a.

As best shown in FIGS. 4 and 5, each of the supporting straps 12–16 is preferably provided with adjustment slide members 38–42 respectively. Adjustment slides 38–42 are preferably double ring slides secured in one loop of each respective strap and through which the free end portion of such strap is adjustably threaded. Such an arrangement allows a maximum range of adjustment in the length of each of the support straps 12–16, and this is important in fitting the harness to the wearer, particularly where the harness is intended for children who vary extensively in size and require some means of adjustment for a comfortable and proper fit.

The chest strap 12 is secured to the shoulder straps 13 and 14 and to the spacer plate 11 without stitching or rivets, by threading it through the looped ends of the shoulder straps 13 and 14 and through the vertical slots 23–26 on spacer plate 11, as illustrated in FIGS. 4 and 5 as follows: through the looped end 32 of shoulder strap 13, rearwardly through vertical slot 23 at the upper right-hand corner of spacer plate 11, through the looped end 31 of shoulder strap 13 (see FIG. 5), forwardly through vertical slot 24, behind the anchoring strap 17, rearwardly through vertical slot 24, through looped end 33 of shoulder strap 14 (see FIG. 5), forwardly through vertical slot 26 at the upper left-hand corner of spacer plate 11 through the looped end 34 of shoulder strap 14. The left-hand end of chest strap 12 (in FIG. 4) is terminated at buckle member 43 which is adapted to be inserted into the slotted buckle member 44 on the opposite end of chest strap 12, and is then folded back and locked by snap connection 45–46 when the strap 12 is in proper position encircling the chest region of the wearer, as clearly shown in FIG. 1.

Similarly, at the lower portion of the improved harness, the pelvic strap 15 extends rearwardly, in FIG. 4, through vertical slot 30 at the lower right-hand corner of spacer plate 11, forwardly through slot 29 (see FIG. 5), behind anchoring strap 17, rearwardly through vertical slot 28, through the looped end 35 of crotch strap 16, forwardly through vertical slot 27, through the looped end 36 of crotch strap 16, and terminates at buckle member 47 which mates with buckle member 48 and locks the pelvic strap 15 about the pelvic region of the wearer, as clearly shown in FIG. 1, with the crotch strap 16 extending between the wearer's legs.

With reference to FIG. 4, it will be noted that the anchoring strap 17 supports the spacer plate 11 slidably thereon so as to permit vertical movement of the plate 11 and the harness relative to the anchoring strap 17; so that the wearer may either stand or sit on the vehicle seat while being protectively harnessed. In addition, when the harness is not being used, the spacer plate 11 is held flatly against the forward surface of the seat back rest 18 and in proper position to be attached to a passenger, without considerable difficulty.

Additionally, the manner in which the chest strap 12 and waist strap 15 are threaded through the slotted spacer plate 11 and the loop ends 31, 33, and 35 of straps 13, 14, and 15 respectively, helps to maintain all of these support straps separated and spaced from one another in their proper positions, so as to facilitate attachment of the harness to the wearer and so that they will not become entangled when the harness is not in use.

As mentioned previously, the back spacer plate 11 of FIG. 3 is preferably constructed of a relatively thin sheet of plastic or the like which will yield or "give" so as to permit some freedom of normal arm and leg movements for the wearer and thus prevent the harness from becoming uncomfortable to wear.

As illustrated in FIGS. 1 and 2, the improved safety harness of the present invention safely supports the wearer in the event of severe deceleration due to a collision or rapid braking or acceleration as from a sharp turn, roll-over, etc., in that the chest strap 12, together with the transversely connected shoulder straps 13 and 14, protectively encompass the upper or chest region of the wearer 10; whereas, the pelvic or waist strap 15, together with the transversely connected crotch strap 16, protectively encompass the lower or pelvic region of the wearer 10, and the entire harness restrains the wearer in place relative to the back of a vehicle seat.

For reasons pointed out previously, and as clearly illustrated in FIGS. 4 and 5, the chest strap 12 and pelvic strap 15 are purposely threaded behind the anchoring strap 17, so that if the spacer plate 11 should tear under excessive force, the anchoring strap 17 still functions to protectively restrain the harness and wearer against the automobile seat 18; i.e. the improved harness construction is fail-safe.

While the invention has been disclosed herein with reference to the details of a certain preferred embodiment thereof, it is to be understood that such disclosure is intended in an illustrative, rather than a limiting, sense, and it is contemplated that various modifications in the construction and arrangement of the parts will readily occur to those skilled in the art, within the spirit of the invention and the scope of the appended claims.

I claim:
1. A safety device adapted to secure a person in a seat and comprising:
   (a) a plate member;
   (b) said plate being configured to define a pair of spaced, horizontal slots extending through said plate member and disposed one above the other;
   (c) An anchoring strap means affixed firmly in place and extending vertically around the back rest of said seat in a closed loop, said anchoring strap means being threaded through each of said horizontal slots to secure said plate member slidably on said anchoring strap means with said plate member disposed flatly against and movable vertically relative to said back rest;
   (d) said plate being configured to define a plurality of support strap slots; and
   (e) support strap means threaded through said support strap slots and passing between said anchoring strap means and said backrest, said support strap means forming a harness for encircling the upper body portion of said person to protectively restrain said person to said plate and said anchoring strap against said backrest.

2. In a safety harness adapted to be worn by a passenger in a vehicle and including means for anchoring said harness to said vehicle, the combination of:
   (a) a plate member having at least one pair of laterally spaced slots extending therethrough; and
   (b) a plurality of support straps configured as a harness adapted to engage the wearer and including
      (1) at least one horizontal support strap secured to said plate member and adapted to encircle the wearer horizontally, and
      (2) at least one transverse support strap having a connecting loop formed at each of its respective ends, said ends being connected in spaced-apart relationship to said horizontal support strap, said transverse strap being adapted to extend about the wearer transversely from said horizontal support strap; and
   (c) said harness being connected to said plate member by successively threading said horizontal support strap through one slot in said plate member, through the connecting loop at one end of said transverse support strap, through the other slot in said plate member, and through the connecting loop at the other end of said transverse support strap.

3. A safety harness adapted to be worn by a passenger in a vehicle comprising:
   (a) a plate;
   (b) said plate being configured to define a pair of spaced, horizontal slots extending through said plate and being disposed one above the other;

(c) an anchoring strap threaded once through each slot of said pair of horizontal slots to secure said plate slidably on said anchoring strap, said anchoring strap being affixed firmly to said vehicle and extending vertically around the back rest of a seat in said vehicle with said plate disposed flatly against said back rest;

(d) said plate being configured to define at least two upper vertical slots extending through said plate member and disposed on each side of said horizontal slots;

(e) a chest strap threaded through said upper vertical slots, behind said anchoring strap, and adapted to encircle the chest region of the wearer;

(f) a pair of shoulder straps each having its ends connected to said chest strap in spaced relationship to extend over the shoulders of the wearer;

(g) said plate being configured to define at least two lower vertical slots extending through said plate and disposed on each side of said horizontal slots;

(h) a pelvic strap threaded through said lower vertical slots, behind said anchoring strap, and adapted to encircle the pelvic region of the wearer; and (i) a crotch strap having its respective ends connected to said pelvic strap in spaced relationship to extend between the legs of the wearer.

4. The safety harness specified in claim 3 wherein said plate is formed of a flexible material for bending when said safety harness is being worn.

5. A safety harness adapted to be worn by a child passenger in a vehicle, comprising:

(a) a flexible plate member;

(b) said plate member being configured to define a pair of horizontal slots extending through said plate member and disposed one above the other adjacent the middle portion of said plate member;

(c) said plate member being configured to define first and second pairs of laterally spaced vertical slots extending through said plate member above and on each side of said horizontal slots;

(d) said plate member being configured to define third and fourth pairs of laterally spaced vertical slots extending through said plate member below and on each side of said horizontal slots;

(e) an anchoring strap threaded once through each of said horizontal slots to secure said plate member slidably on said anchoring strap; said anchoring strap extending vertically around the back rest portion of a seat in said vehicle and being firmly affixed to said vehicle;

(f) a pair of shoulder straps each having connecting loops at their respective ends and adapted to extend over the shoulders of the wearer;

(g) a chest strap threaded through one end loop of a first shoulder strap, rearwardly through the outermost slot of said first pair of vertical slots, through the other end loops of said first shoulder strap, forwardly through the other slot of said first pair of vertical slots, behind said anchoring strap, rearwardly through the innermost slot of said second pair of vertical slots, through one end loop of the second shoulder strap, forwardly through the other slot of said second pair of vertical slots, and through the other end loop of said second shoulder strap, and being adapted to encircle the chest region of the wearer;

(h) a crotch strap having connecting loops at its ends and adapted to extend between the legs of the wearer; and (i) a pelvic strap threaded rearwardly through the outermost slot of said third pair of vertical slots, forwardly through the other slot of said third pair of vertical slots, behind said anchoring strap, rearwardly through the innermost slot of said fourth pair of said vertical slots, through one end loop of said crotch strap, forwardly through the other slot of said fourth pair of vertical slots, through the other end loop of said crotch strap, and being adapted to encircle the pelvic region of the wearer.

6. The safety device of claim 1 wherein said plate is formed of a flexible material for bending when said harness is worn by said person.

References Cited by the Examiner

UNITED STATES PATENTS

| | | | |
|---|---|---|---|
| 1,298,615 | 3/1919 | Wilkinson | 297—289 X |
| 1,642,911 | 9/1927 | Thurnau | 297—385 X |
| 2,758,769 | 8/1956 | Nunn et al. | 297—389 X |
| 2,817,393 | 12/1957 | Mitchell | 297—385 |
| 2,979,028 | 4/1961 | Zakely | 297—389 X |
| 2,998,008 | 8/1961 | Klesa | 297—385 |
| 3,028,200 | 4/1962 | Dye | 297—389 |
| 3,099,486 | 7/1963 | Scott | 297—389 |

FRANK B. SHERRY, *Primary Examiner.*

J. T. McCALL, *Assistant Examiner.*